March 23, 1954     G. G. SHARP ET AL     2,672,840

SHIP FOR TRANSPORTATION OF WHEELED CONTAINERS

Filed June 28, 1949     2 Sheets-Sheet 1

INVENTORS
George G. Sharp
Lorentz Hansen
by
Campbell, Brumbaugh, Free & Graves
Their Attorneys March 23, 1954  G. G. SHARP ET AL  2,672,840
SHIP FOR TRANSPORTATION OF WHEELED CONTAINERS
Filed June 28, 1949  2 Sheets-Sheet 2
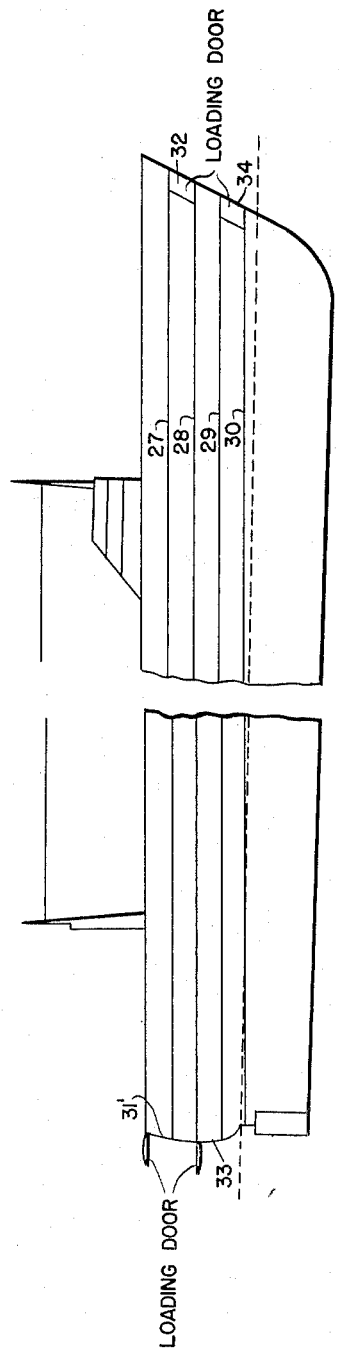
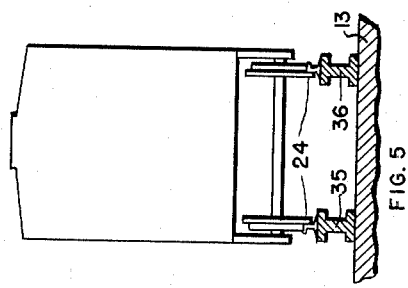
INVENTOR
George G. Sharp
Lorentz Hansen
BY Campbell, Brumbaugh, Free + Graves
ATTORNEYS Patented Mar. 23, 1954

2,672,840

UNITED STATES PATENT OFFICE 2,672,840

SHIP FOR TRANSPORTATION OF WHEELED CONTAINERS

George G. Sharp, Millburn, N. J., and Lorentz Hansen, Crestwood, N. Y.

Application June 28, 1949, Serial No. 101,774

3 Claims. (Cl. 114—70)

This invention relates to improvements in the design and construction of self-propelled or towed vessels, such as ships, barges, ferries, boats for use in ocean-going, coastwise, inland bay, lake, river and sound waters for the transportation of wheeled containers or vehicles such as railroad cars, trucks, truck trailers, automobiles and the like.

It has for some time been recognized that a large number of certain types of wheeled containers or vehicles with their contents can be moved between two water front locations at an over-all cost less than the cost of moving the same containers and their contents between the same two ports by rail or highway, by loading them at one port aboard a self-propelled or towed water-borne vessel equipped to accommodate such containers or vehicles and by transporting them aboard the vessel for discharge at another port. It has also been recognized that, in many cases, it is less expensive to transport the wheeled containers or vehicles and their contents by self-propelled or towed water-borne vessel than to unload the contents of the containers, then load said contents aboard the vessel and discharge them at the second location or port. However, the vessels provided heretofore for the handling of wheeled containers are expensive to build and require a great deal of equipment to handle the containers or vehicles. Usually, the wheeled containers, referred to hereinafter as vehicles, are carried on a single level in the vessel in order to avoid the need for costly hoisting apparatus. As a result, the capacity of the vessel is limited to the number of vehicles that can be carried on a single deck. Some vessels have, however, been equipped with two or more levels or decks for receiving the vehicles. These vessels or the ports which serve them have to be equipped with hoisting machinery to lift the vehicles or lower them between decks. Also, other machinery for hauling the individual vehicles along the decks is necessary. Moreover, in this latter multiple deck type of vessel, the cost and time of handling, i. e., turn around time has been adversely affected by the limitation imposed on the number of vehicles that can be handled simultaneously.

It is evident from the foregoing that a vessel which could be loaded with vehicles on two or more levels without the need of special hoisting, shifting or moving machinery would provide economies that would render such a vessel economically far superior to the prior types of vessels for transporting vehicles.

An object of the invention therefore is to provide an improved deck arrangement in vessels of the type referred to above whereby loading and unloading of the vessel is facilitated and the time and cost of loading, handling and unloading are very markedly reduced.

Another object of the invention is to provide a vessel having one or more pairs of decks so arranged that each pair of decks can be loaded from a single level on shore.

Another object of the invention is to provide a deck arrangement in a vessel whereby a number of vehicles can be loaded onto and unloaded from the deck simultaneously as an integrated group, rather than individually.

A further object of the invention is to provide an arrangement of the decks of the vessel whereby a greater number of vehicles can be stowed in a vessel of a given cubic capacity.

Other objects and advantages of the invention will become apparent from the following description of a typical vessel embodying the present invention.

In accordance with the present invention, one or more pairs of superimposed decks are arranged within the vessel with one end of each of the decks of a pair at the same height above the water line of the vessel so that these decks can be loaded from the same shore level or from a float or dock having a substantially fixed height with respect to the water level. More particularly, the decks for receiving the vehicles are inclined with respect to the water line of the vessel so that the lower end of the uppermost of a pair of decks is, at one end of the vessel, at about the same level with respect to the water line as the upper end of the lower deck at the opposite end of the vessel. By the provision of doors at both ends of the vessel, it is thus possible to load either deck through an opening at its end by connecting the ship to a shore based loading apron of the kind normally used to load car floats, vehicular ferries and the like.

A group of vehicles such as freight cars approximately equal in length to the length of the deck may be loaded in a string on one pair of tracks on the deck, another group onto an adjacent pair of tracks and so on, until all of the tracks on the deck are loaded. The vessel can then be turned and the opposite end connected to the loading apron and the other deck loaded in the same manner.

As an alternative, when facilities are available, the vessel can be loaded from both ends at the same time so that the loading time is reduced substantially by one half. As a further alternative, through utilizing a two level pier equipped with necessary facilities, a total of four decks can be loaded in the manner described.

The power required for moving strings of freight cars or other vehicles may be provided by a switch engine or tractor or by capstans or continuous chains, cables or belts aboard the vessel.

A marked saving in deck space can be obtained by mounting the runways or tracks for the vehicles a sufficient distance above the decks to provide unobstructed working space below them for access to the vehicles during jacking, chocking and lashing to prevent shifting. In this way, space between the runways or tracks can be reduced to a minimum, thereby allowing more runways or tracks than in the usual installation.

Inasmuch as in many instances, particularly with handling strings of freight cars and the like, the power for moving such strings need not be supplied by the vessel or applied through machinery or equipment on the vessel, the construction of such vessels is greatly simplified and the cost of production of the vessels is correspondingly reduced.

For a better understanding of the present invention, reference may be had to the accompanying drawings, in which:

Fig. 4 is a view in longitudinal section of a vessel embodying the present invention and having four car-carrying decks; and Fig. 5 is a view in section through a portion of one of the decks of the vessel showing elevated supports for the railroad tracks in the vessel.

The form of the invention chosen for purposes of illustration is an ocean-going, self-propelled ship equipped with two decks for transporting railway cars. However, it will be understood that the same principles of construction may be used in coastwise and lake transport vessels, ferry boats and smaller boats, ships or barges to be used on inland waterways, and in the transportation of such other types of vehicles as trucks, trailers, automobiles and the like.

Figure 1:
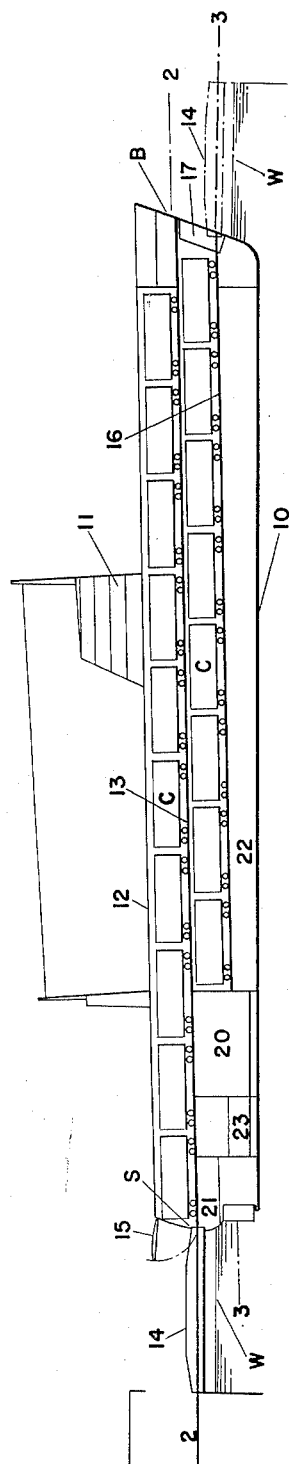
Fig. 1 is a view in longitudinal section of a typical vessel embodying the present inventon.
Figure 2:
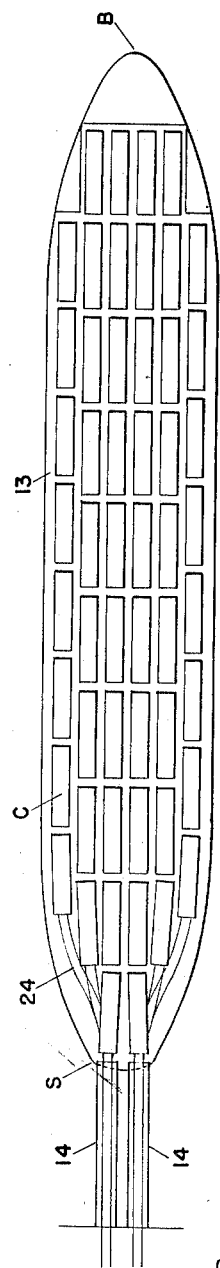
Fig. 2 is a view in section taken on line 2—2 of Fig. 1.
Figure 3:
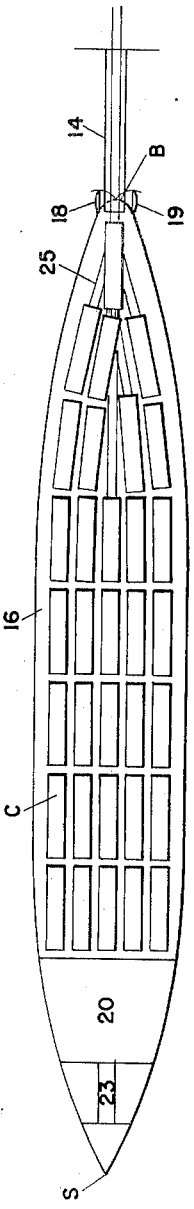
Fig. 3 is a view in section taken on line 3—3 of Fig. 1.

Referring now to Fig. 1, the vessel 10 has a substantially conventional hull including a superstructure 11 in which are located the quarters for the crew, passengers, officers, radio office, pilot house and other facilities. The vessel is provided with an upper deck 12 which, as illustrated, may be inclined with respect to the water line W of the vessel.

Below the upper deck 12 is a second deck 13 which is also inclined with respect to the water line. The deck 13 slopes upwardly from the stern S of the vessel to its bow B, the lower end being disposed at a level somewhat above the water line to permit it to be aligned with and connected to a shore based loading apron 14 of known type. The stern of the ship has a hinged water-tight door 15 of the type commonly used in car train ships so as to permit the stern of the vessel to be opened for loading the deck 13. It will be understood that other types of doors may be used equally well.

The vessel also has another deck 16 which is substantially parallel to the deck 13 and thus has its after end disposed below the level of the loading apron 14 and its upper end, at the bow of the ship, at substantially the same level as the lower end of the deck 13. In this way, by turning the ship end for end, the deck 13 or the deck 16 can be loaded from the same loading apron 14. Alternatively, if the dock facilities are such as to include two opposed loading aprons at opposite ends of the vessel, the decks 13 and 16 can be loaded simultaneously. The loading opening 17 at the upper end of the deck 16 is provided with hinged doors 18 and 19.

The hull may be suitably compartmented or otherwise constructed to provide an engine room 20, a steering gear compartment 21, an access tunnel 22 beneath the decks and a shaft alley 23 extending from the machinery space, as well as other compartments for receiving additional freight, fuel and the like, as may be required.

In the form of vessel illustrated, each of the decks 13 and 16 is provided with railroad tracks 24 and 25 which are suitably laid out to accommodate as many strings of cars as can be fitted within the deck space. The tracks 24 on the deck 13 converge toward the stern opening and may be provded with suitable switching facilities, not shown, whereby strings of freight cars C may be switched onto the several tracks 24 within the vessel by means of a switch engine, tractor or other loading equipment such as capstans, continuous chains or belts, not shown, and the like.

Similarly, the deck 16 is provided with a series of the tracks 25 also arranged to permit the successive loading of strings of freight cars through the opening in the bow of the ship.

It will be understood that one or more of the decks may be provided with ramps or runways for handling other vehicles such as trailers and the like. Also, if desired, and as shown in Fig. 4, four decks 27, 28, 29 and 30, respectively, arranged in pairs, as described above, may be provided in the vessel, these pairs of decks being arranged with their loading and unloading openings 31, 32, 33 and 34 at two different levels. The pairs of decks are loaded by means of loading aprons at two different levels. In order to conserve deck space, the tracks 24 or runways may be mounted on beams or blocks 35, 36 to support the vehicles above the deck 13, for example, a sufficient distance to permit the crew to move freely below the tracks or runways to lock the vehicles against shifting at sea as shown in Fig. 5. The tracks 25 may be supported in a similar manner in spaced relation to the deck 16. The tracks or runways may be spaced sufficiently close to each other to accommodate one or more additional tracks or runways than are provided by the customary spacing inasmuch as passages for the crew between the vehicles are unnecessary when space is provided beneath the tracks.

From the preceding description, it will be apparent that a ship of the type described may be quickly and efficiently loaded and unloaded with a minimum of loading machinery on the ship and especially that two or more decks may be loaded without the use of any hoisting machinery, thereby greatly simplifying and reducing the cost of construction of the vessel and its equipment. Moreover, the arrangement of the decks, runways and tracks is such as to expedite the handling of the vehicles in groups, thereby reducing to a minimum the amount of handling of individual vehicles.

Inasmuch as the invention can be applied to many different sizes and designs of water-borne vessels, the ship described above should be considered as illustrative of the invention and not as limiting the scope of the following claims.

We claim:

1. A sea-going ship for transporting vehicles comprising a hull having an upper deck, at least two additional substantially flat decks in said hull extending lengthwise thereof throughout substantially the entire length of said hull, said decks having railroad tracks thereon and being spaced apart vertically more than the height of a railroad freight car and inclined lengthwise of said hull with respect to the water line of said hull to position one end of one of said decks at one end of said hull in about the same horizontal plane as the end of the other deck at the opposite end of said hull, the inclination of the decks in the hull being such that the decks can be loaded with strings of freight cars by means of a locomotive, and doors at opposite ends of said hull for access to said decks.

2. The ship set forth in claim 1, comprising means for supporting said tracks above and in spaced relation to their corresponding decks to give access to said tracks and any vehicles thereon from below.

3. A sea-going ship for transporting vehicles comprising a hull having an upper deck, a second substantially flat deck below said upper deck, and a third deck below said second deck, said second and third decks being substantially parallel and extending substantially the entire length of said hull, said second and third decks being inclined lengthwise of said hull with respect to a plane parallel to the water line of said hull and being spaced apart at least the height of a railroad freight car, railroad tracks on said second and third decks, the inclination of said second and third decks being sufficient to locate the upper end of the lower deck at one end of said hull and the lower end of the upper deck at the opposite end of said hull substantially in said plane and less than the maximum inclination on which strings of railroad freight cars can be handled by a switch engine, openings in the opposite ends of said hull communicating with said first and second decks, and watertight doors mounted on said hull for closing said openings.

GEO. G. SHARP.
LORENTZ HANSEN.

References Cited in the file of this patent

UNITED STATES PATENTS

| Number | Name | Date |
|---|---|---|
| 461,119 | Murch | Oct. 13, 1891 |
| 698,573 | Smith | Apr. 29, 1902 |
| 1,541,989 | Miller | June 16, 1925 |
| 1,772,612 | McDougall | Aug. 12, 1930 |
| 2,370,916 | Reedy | Mar. 6, 1945 |

FOREIGN PATENTS

| Number | Country | Date |
|---|---|---|
| 269,021 | Great Britain | Apr. 14, 1927 |